United States Patent
Dutcher et al.

(10) Patent No.: US 6,347,331 B1
(45) Date of Patent: Feb. 12, 2002

(54) METHOD AND APPARATUS TO UPDATE A WINDOWS REGISTRY FROM A HETROGENEOUS SERVER

(75) Inventors: David Paul Dutcher; Randall M. George, both of Austin; Brian Keith Howe, Round Rock; Stanley Alan Smith, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,939

(22) Filed: Apr. 26, 1999

(51) Int. Cl.[7] .............................................. G06F 13/00
(52) U.S. Cl. ........................ 709/203; 709/220; 709/221
(58) Field of Search ................................. 709/200, 203, 709/208, 212, 216, 217, 218, 219, 220, 221, 224

(56) References Cited

U.S. PATENT DOCUMENTS 5,761,499 A * 6/1998 Sonderegger ................ 707/10
5,784,563 A * 7/1998 Marshall et al. ............. 709/221
5,796,633 A * 8/1998 Burgess et al. .............. 709/207
5,809,230 A * 9/1998 Pereira ........................ 713/200
6,154,765 A * 11/2000 Hart ............................ 709/201
6,212,536 B1 * 4/2001 Klassen et al. .............. 707/513

\* cited by examiner

Primary Examiner—Moustafa M. Meky
(74) Attorney, Agent, or Firm—Duke W. Yee; Jeffrey S. LaBaw; Stephen J. Walder, Jr.

(57) ABSTRACT

A method and apparatus in a data processing system for managing registries. A user is detected at a client data processing system, wherein a change has occurred in access for the user. A registry file is sent containing user specific information for the user to the client data processing system. A registry on the client data processing system is updated using the registry file using commands specific to the platform, wherein an updated registry is created including the user specific information. The updated registry is sent to a depository.

21 Claims, 5 Drawing Sheets

```
REGEDIT4

[HKEY_CURRENT_USER\SOFTWARE\IBM]
"@"="Default Value"

[HKEY_CURRENT_USER\SOFTWARE\IBM]
"String Value"="String Data"

[HKEY_CURRENT_USER\SOFTWARE\IBM]
"Binary Value"=hex:01,02,AA,FF,53

[HKEY_CURRENT_USER\SOFTWARE\IBM\New Key]
"DWORD Value"=dword:04030201
```

```
[Version]
Signature="$CHICAGO$"

[DefaultInstall]
AddReg=AddReg

[AddReg]
HKCU,"Software\IBM","",0,"Default Value"
HKCU,"Software\IBM","String Value",0,"String Data"
HKCU,"Software\IBM","Binary Value",196609,01,02,AA,FF,53
HKCU,"Software\IBM\New Key","DWORD Value",65537,04,03,02,01
```

METHOD AND APPARATUS TO UPDATE A WINDOWS REGISTRY FROM A HETROGENEOUS SERVER

CROSS REFERENCE TO RELATED APPLICATIONS

The present invention is related to applications entitled METHOD AND APPARATUS FOR DYNAMIC DISTRIBUTION OF SYSTEM FILE AND SYSTEM REGISTRY CHANGES IN A DISTRIBUTED DATA PROCESSING SYSTEM, Ser. No. 09/299,936, still pending; METHOD AND SYSTEM FOR MANAGING WINDOWS DESKTOPS IN A HETEROGENEOUS SERVER ENVIRONMENT, Ser. No. 09/299,937, still pending; METHOD AND SYSTEM FOR USER-SPECIFIC MANAGEMENT OF APPLICATIONS IN A HETEROGENEOUS SERVER ENVIRONMENT, Ser. No. 09/299,951, still pending; METHOD AND SYSTEM FOR MANAGING WINDOWS APPLICATIONS IN A HETEROGENEOUS SERVER ENVIRONMENT, Ser. No. 09/299,950, still pending; and METHOD AND SYSTEM FOR CAPTURING AND STORING SYSTEM CHANGES FOR APPLICATION TO MULTIPLE USERS AND SYSTEMS IN A HETEROGENEOUS SERVER ENVIRONMENT, Ser. No. 09/299,952, still pending; all of which are filed even date hereof, assigned to the same assignee, and incorporated herein by reference.

BACKGROUND OF THE INVENTION

1. Technical Field

The present invention relates generally to an improved distributed data processing system and in particular to a method and an apparatus for providing users access to applications at different clients within the distributed data processing system.

2. Description of Related Art

In distributed data processing systems, the client-server model is a well-known environment. In this model, the user of a computer utilizes a "client" system. The client system runs any of a number of computer operating systems to manage the basic functions that users execute, such as accessing files, executing programs, and system administration, as well as to serve as the base against which programs are written. Well-known client operating systems include Microsoft Windows 3.1, Windows for Workgroups, Windows 95, IBM® OS/2® Warp, Apple Macintosh, DOS, many variations of UNIX, and Microsoft Windows NT. The client system serves as the user's workstation, and it may execute programs as well as store some user data.

The server system can also run any of a number of computer operating systems. Well-known server operating systems include, for example, Novell NetWare, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

The client-server model continues to evolve to meet the need for distributed resources. As personal computers have gained more functionality and reliability, end-users have improved their productivity through the use of a variety of distributed computing resources. While some enterprise data and legacy applications continue to be placed on reliable mainframe platforms, the need for distributed enterprise access to large numbers of applications and large amounts of data continues to grow.

Operating systems and computing hardware platforms have proliferated, and each combination of computer hardware and software addresses the need for a variety of price, performance, legacy compatibility, and features. Traditional PCs, such as desktop and laptop PCs, are designed to offer highly sophisticated end-user environments. The installation of workgroup computing software and complete application suites requires a computer with significant local storage and local networking capabilities. Network computers (NCs), on the other hand, offer a different type of versatility as they may provide limited access to Java™ and Windows™-based applications. NCs are typically implemented with only a general purpose processor, a system memory, and a communications port. Therefore, NCs typically rely upon network access to provide dynamic, non-volatile data storage capability.

Each of the various implementations of the client-server model has advantages and disadvantages. Networked PCs have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PCs retain some semblance of a standard configuration. Many operating systems provide various levels of system administration capabilities for accomplishing such administrative tasks. However, as users become more technically sophisticated through everyday use of various computing devices, users demand more options in their access to data and to computing resources. For example, people who travel extensively or work at various locations may rely on the ability to have access to a common set of applications wherever they are located. Enormous costs and amounts of time may be spent in accommodating user preferences while pursuing corporate directives for the use of standard configurations.

Industry standards have been developed for both critical and common functions to aid in the implementation of a system containing different types of client systems accessing different types of server systems. The use of these standards on the client and server afford users the opportunity to carry out functions in a consistent manner on a variety of common client and server operating systems, thereby reducing administrative costs. For example, one of the activities that has been standardized is the "authentication" of users. Authentication refers to the process in which a user is validated as being able to complete a logon and/or access a system. Standard protocols have been defined within the X/Open Server Message Block (SMB) specification and the Open Systems Foundation (OSF) Distributed Computing Environment (DCE) specification. While many products and operating systems have been developed that utilize standard protocols, not all products have used the standards. Hence, enterprises confront the difficult challenge of cost-effectively maintaining system administrative knowledge of enterprise-wide computer configurations while allowing some amount of user-specific configuration flexibility within a variety of operating systems that use non-standard protocols and data file formats.

With respect to the use of non-standard protocols, Windows 95, Windows 98 and Windows NT are such an example. With these operating systems, updates to the operating system including configuration changes, operating system settings, device drivers, and installation of applications all use the registry to store and retrieve information from values within the registry. The registry contains information that is partitioned into two sections. General system information is found in one section and user specific information is found in the other section of the registry. Updates to the registries in the operating systems, however, only can be made using Microsoft Windows application program interfaces (APIs). As a result, distributed data processing systems in which non-Windows servers are present, these servers are unable to initiate and incorporate changes to the registry.

Thus, it would be advantageous to have an improved method and apparatus to manage registry information on clients in a distributed data processing system.

SUMMARY OF THE INVENTION

The present invention provides a method and apparatus in a data processing system for managing registries. A user is detected at a client data processing system, wherein a change has occurred in access for the user. A registry file is sent containing user specific information for the user to the client data processing system. A registry on the client data processing system is updated using the registry file using commands specific to the platform, wherein an updated registry is created including the user specific information. The updated registry is sent to a repository.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
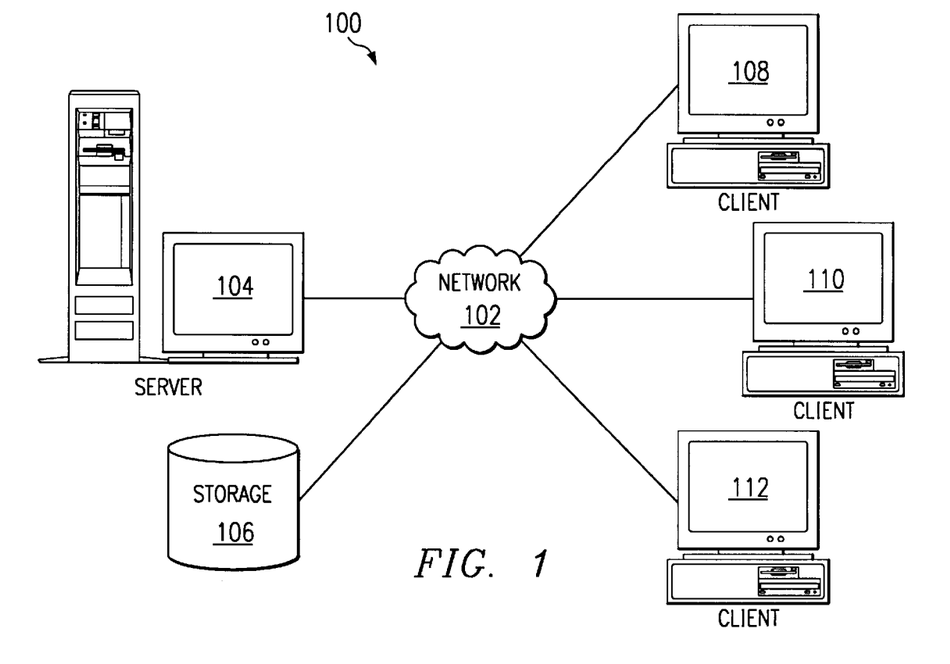
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

A client running the same operating system as the server is said to be "native," whereas a client running a different operating system from the server is said to be "non-native." Given a Microsoft Windows NT client, examples of non-native servers may include, without limitation, IBM OS/2 Warp Server, IBM LAN Server, other types of Server Message Block (SMB) servers, as well as operating systems that run Open Systems Foundation (OSF) Distributed Computing Environment (DCE) software. An example of the latter is a DCE Cell running Distributed File System (DFS).

The term "homogenous" is commonly used to describe an environment in which the operating system of the client and the operating system of the server that is accessed by the client are the same. The term "heterogeneous" is commonly used to describe an environment in which the client operating system and the server operating system are different.

Figure 2:
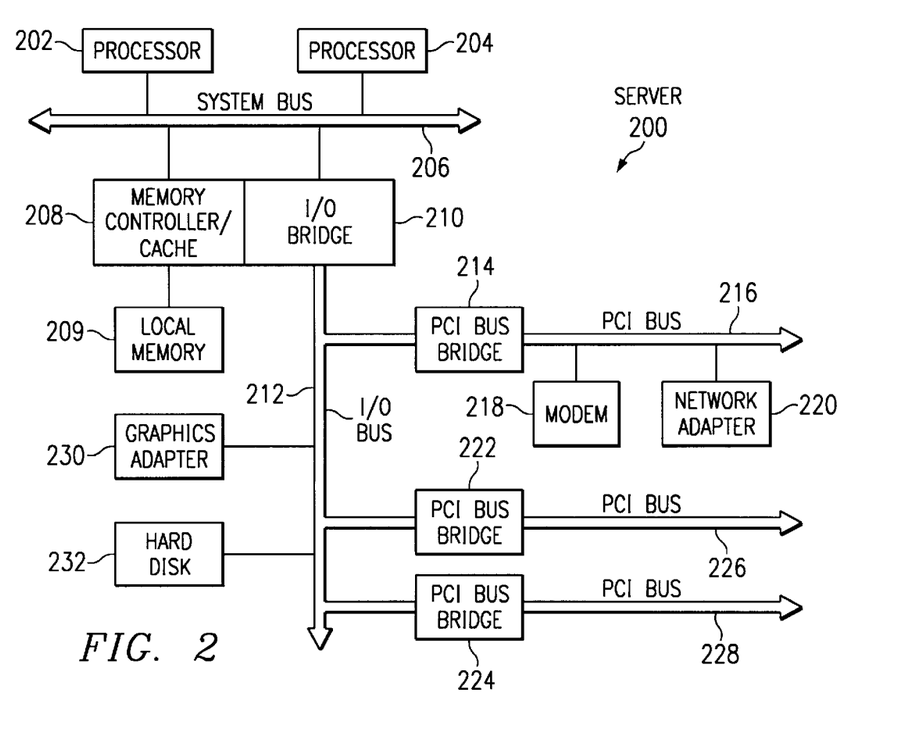
FIG. 2 is a block diagram depicting a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
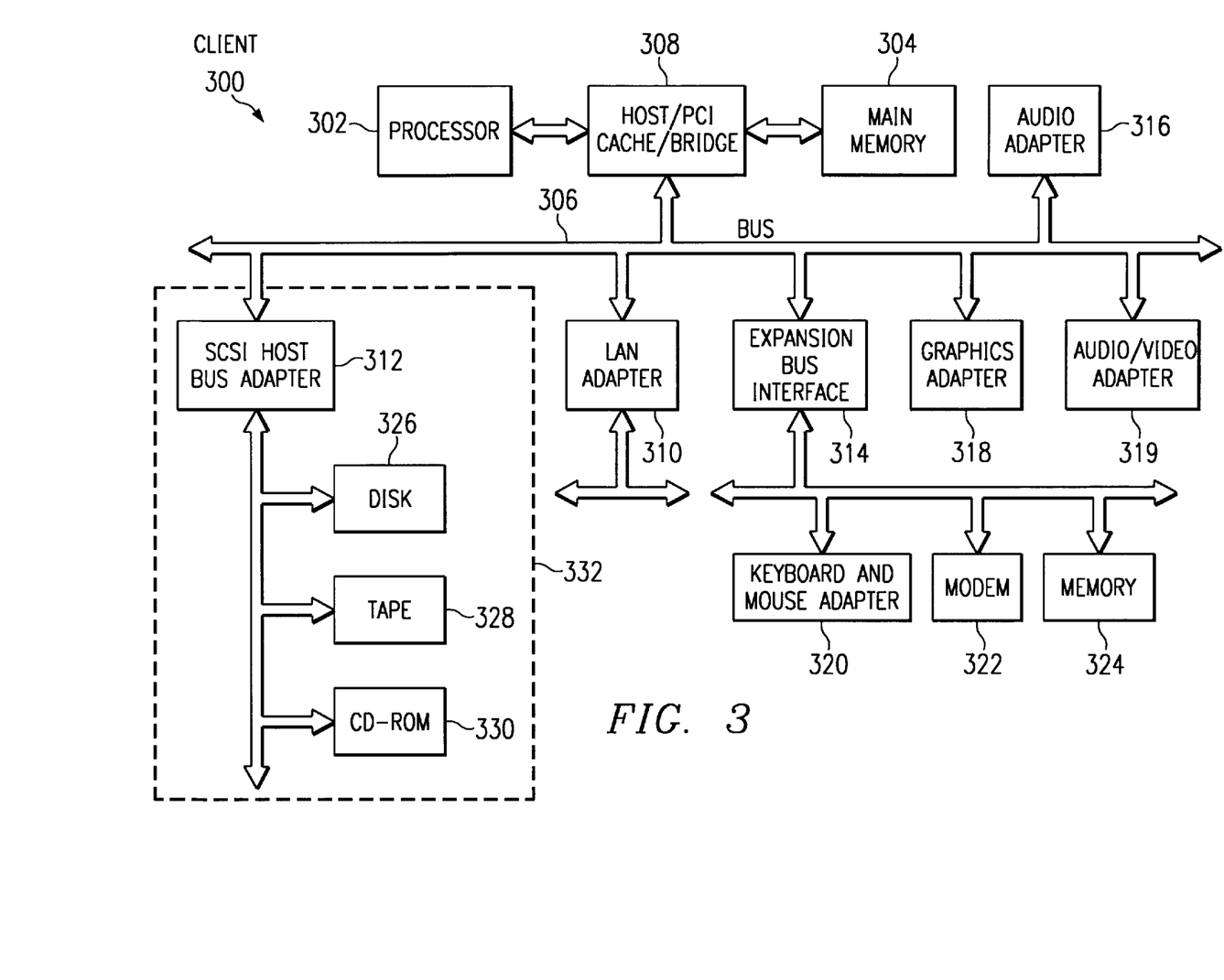
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instruction for updating a registry or other similar data structure from a heterogeneous server. The present invention provides a mechanism to allow heterogeneous servers to initiate and manage the updating of a Windows registry. The use of a term "Windows" in this description refers to a Window based system, such as Windows 95, Windows 98, and Windows NT, which are available form Microsoft Corporation. A set of user registry settings for an application are placed in a format, such as a .REG or .INF file format. Further, the registry settings may be placed in other formats supported by the client system, which in this example is a Windows based system. These registry settings include information needed to run the application on the client in a manner set up for a particular user. A registry is a central hierarchical database in Windows 95 and Windows NT used to store information necessary to configure the system for one or more users, applications, and hardware devices. The registry contains information that Windows 95, Windows 98 and Windows NT continually reference during operation, such as profiles for each user, the applications installed on the computer and the types of documents each can create, property sheet settings for folders and application icons, what hardware exists on the system, and which ports are being used. Registry files (.REG) contain information that may be used to update the registry on a client. Initialization files (.INI) contain user preferences and startup information about an application. Information files (.INF) are files containing set up information for applications and can also be used to initiate registry changes.

When an application is added to a specific user by an administrator at the server, a batch file or another type of file is created in a location on the server that is accessible by a client on the network. For example, the file may be located in a location on the server that is uniquely accessible by the user to which the application was added. In the depicted example, the batch file contains Windows API calls that trigger an update to the registry on the client. In these examples, the update is to a user portion of a registry.

When the user uses a Windows client machine and authenticates to the server, the batch file is accessed on the server and executed. The execution of the batch file causes Windows API calls to be executed. These calls are used to update the registry on the client using the information created in the registry (.REG) or information (.INF) files generated when the application was created or during some other system change. After this update to the user portion of the registry on the client is made, that portion of the registry is saved on a persistent storage for later use the next time the user authenticates, which is also referred to as "logging on". In the depicted examples, the updated registry is written back to a persistent storage location on the server.

Figure 4:
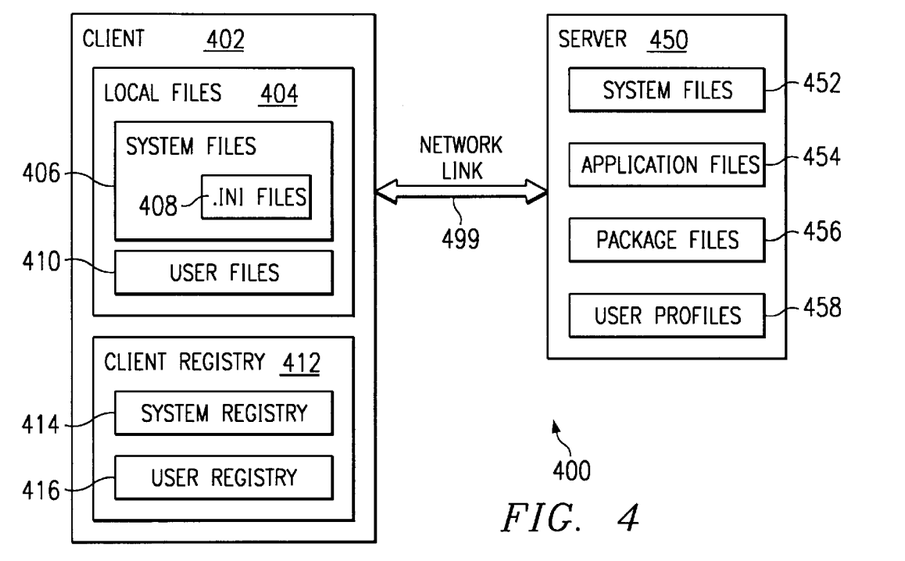
FIG. 4 is a block diagram depicting an example of the storage of pertinent information within a client server environment that may be implemented in the present invention.

With reference now to FIG. 4, a block diagram depicts an example of the storage of pertinent information within a client server environment that may be implemented in the present invention. System 400 contains client 402 that communicates with server 450 across network link 499. Client 402 contains local files 404 consisting of such files as application files, data files, device drivers, operating system files, or other types of files. Local files 404 may include specific categories of files such as user files 410 and system files 406. User file 410 may be those application and data files that customize or configure client 402 in a personal manner for a specific user. System files 406 may include operating system and application files available for use to any user of client 402. System files 406 may include .INI files 408. In the DOS and Windows operating systems, the ".INI" file extension identifies an initialization file that contains user preferences and start up information about an application program.

Client 402 also contains client registry 412. The registry is a central hierarchical database in the Windows 9X and Windows NT operating systems. Windows 9X refers to Windows 95, Windows 98, and its successor operating systems. The registry stores information necessary to configure a computer system for one or more users, applications, and hardware devices. The registry contains information that Windows 9X and Windows NT continually reference operation, such as profiles for each user, the applications installed on the computer, the types of documents that each application may create, information about folders and icons, the type of hardware on the computer system, and the configuration of the input/output boards. Entries and registry 412 may be categorized as system-related entries and user-related entries shown as system registry 414 and user registry 416.

Server 450 contains sets of files that may be sent from server 450 to configure client 402 upon startup of client computer. System file 452 may include system image files or other operating system files that provide boot up capability of the client computer. Application file 454 contains application programs that may be executed on the client computer for various data processing capabilities. Package files 456 are files that enable a system administrator to manage applications from the server to decide whether specific users can access specific applications. Application packages may contain one or more applications. These package files are not distributed to the client, they are just used at the server. Application location pages are a collection of system files, system registry entries, user files, shortcuts, and user registry entries. Application packages may be as small as a single file. These packages are stored as a server so that they can be access and distributed to client systems. Application packages may contain one or more applications. User profiles 458 contains other information or files that may be sent from the server to a client to customize a client computer for a specific user.

Figure 5:
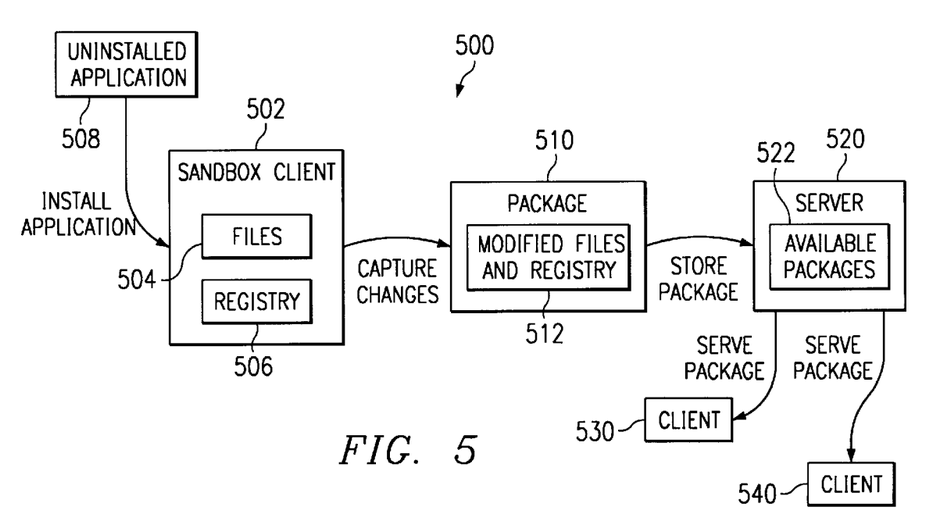
FIG. 5 is a block diagram depicting the overall process for capturing configuration information for customizing a client environment from a heterogeneous server.

With reference now to FIG. 5, a block diagram depicts the overall process for capturing configuration information for customizing a client environment from a heterogeneous server. Sandbox client 502 contains files 504 and registry 506. Using the metaphor of a sandbox as a container within which a structure may be molded and shaped in a customized manner, sandbox client 502 is a client within a specific domain with an unrestricted desktop and the capability for capturing modifications to the client and storing those modifications on the server.

At some point, a system administrator desires to provide access to an application for a user or class of users. The system administrator installs uninstalled application 508 onto sandbox client 502. During the installation process, files 504 and registry 506 on sandbox client 502 will be modified. These modifications are captured as modified files and registry 512 within package 510. Package 510 contains information necessary for recreating the environment within the sandbox client with the addition of the newly installed application. The package is stored as one of the available packages 522 on server 520. As part of the user account administration procedures, system administrator provides access to a package for a user as part of the users expected run time environment. One or more applications may be present in a package. If the user logs on to client 530, one of the available packages may be served to client 530 during the users logon process. The package will provide the user with a familiar environment so that a user may be immediately productive on client 530 even if the user has never used that particular machine before. The user may roam within the domain, and the system will serve the proper package to the user so that the user always has access to a familiar run time environment. If the user logs on to client 540, then the same environment may be familiar to using on client 530 will follow the user to a new machine.

Figure 6:
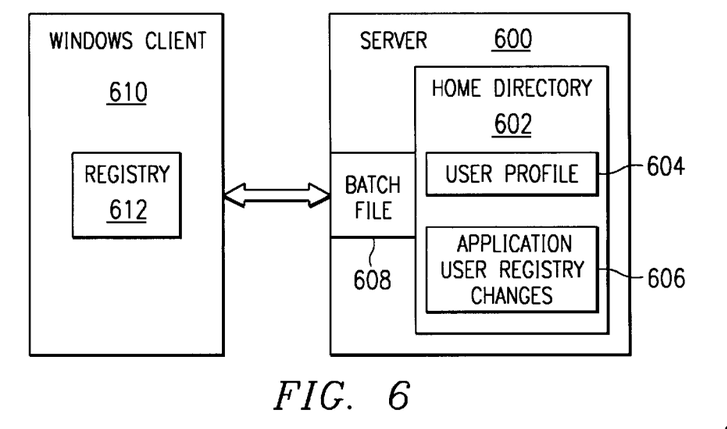
FIG. 6 is a block diagram illustrating components used in updating a registry at a client depicted in accordance with a preferred embodiment of the present invention.

With reference now to FIG. 6, a block diagram illustrating components used in updating a registry at a client is depicted in accordance with a preferred embodiment of the present invention. Server 600 in this example contains a home directory 602 for a specific user. Each user is assigned a home directory on server 600. In this example, home directory 602 includes a user profile 604 and application user registry changes 606. User profile 604 contains information specific to the particular user. For example, user settings for applications and desktop are located in user profile 604. Application user registry changes 606 contains the changes needed to tailor the application to the specific user. Application user registry changes 606 in this example may be a .REG or a .INF file. A batch file 608 also is located on server 600. In this example, Windows client 610 includes a registry 612. Registry 612 does not contain the necessary user settings for the user associated with home directory 602. When that user logs on or authenticates with server 600, batch file 608 will be executed to initiate the necessary changes to registry 612. These changes are made using the information in application user registry changes 606. Batch file 608 contains the necessary calls to change registry 612. Once registry 612 has been changed, the user portion of the registry is returned to server 600 for storage in user profile 604. The next time the user logs on to server 600, this user portion of the user registry will be returned to client 610 such that user specific settings for the application is set up for the particular user. In this manner, the user is able to move to other clients and have the same user settings for the application.

Figures 7, 8, 9, 10:
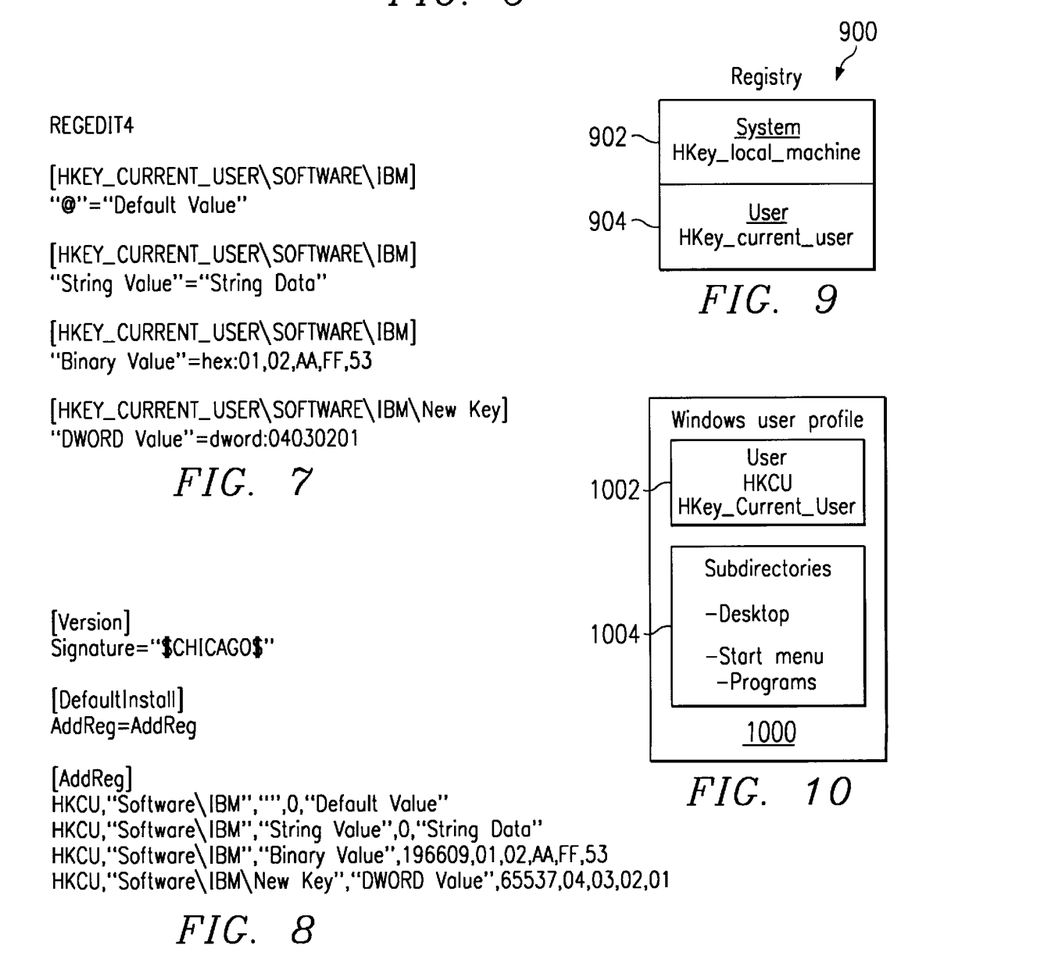
FIG. 7 is an example of a .REG file depicted in accordance with a preferred embodiment of the present invention.
FIG. 8 is an example of a .INF file depicted in accordance with a preferred embodiment of the present invention.
FIG. 9 is a registry depicted in accordance with a preferred embodiment of the present invention.
FIG. 10 is a diagram illustrating a Windows user profile depicted in accordance with a preferred embodiment of the present invention.

With reference now to FIG. 7, an example of a .REG file is depicted in accordance with a preferred embodiment of the present invention. In FIG. 8, and example .INF file is depicted in accordance with a preferred embodiment of the present invention. Both of these files contain user information that is to be placed into a registry on a client through API calls. In FIG. 7, the examples are used to change or update the registry on a client. The statements have the following general format in Windows 95 and 98: "HKCU, 'Software\IBM','ValueName',0,'Data'" where "HKCU" is the current user registry key. "Software\IBM" indicates the key to add/change. "ValueName" is the key value to add/change. "0" is the string type. "Data" indicates key data to add/change. Another general format is: "'C:\test.inf','new section', 'keyl=val1'". This format is used to make updates to values in the registry.

"C:\test.inf" is the .INF file to create/change. "new section" indicates the .INF section to create/change. "keyl=val1" is the key, value pair to create/change. In Windows NT, a similar command is used as follows: "rundll32.exe setupapi.dll,InstallHinfSection DefaultInstall 128 filename.inf". "rundll32.exe" is the executable run. "setupapi.dll" indicates the dll to use.

"InstallHinfSection" indicates the parameter to the setupx.dll. "DefaultInstall" indicates section in the filename.inf file to install. "128" is the reboot parameter (128 is do not reboot). "filename.inf" indicates the name of the INF file to install. Next, commands used to install registry files, .REG, take the following format: "regedit.exe /s filename.reg" "regedit.exe" is the executable run. "/s" indicates silent mode (do not display message boxes). "filename.inf" indicates the name of the REG file to install.

These calls are placed in batch files. A call used to write changes from a registry file may be as follows: regedit.exe /s filename.reg. "regedit.exe" is the executable to be run. "/s" indicates that a silent mode is to be used in which a display message box is not shown. "filename.reg" is the name of the registry file that is to be installed. In writing registry changes from an information file, the following command is used for Windows 95 and Windows 98: "rundll.exe setupx.dll,InstallHinfSection DefaultInstall 128 filename.inf" or "rundll32.exe setupapi.dll, InstallHinfSection DefaultInstall 128 filename.inf". In Windows 95/98 the command to install Windows 95/98 INF file are as follows: "rundll.exe" is the executable run. "setupx.dll" is the dll to use. "InstallHinfSection" indicates the parameter to the setupx.dll. "DefaultInstall" indicates the section in the filename.inf to install. "128" indicates the reboot parameter (128 is do not reboot). "filename.inf" is the name of the file to install. In Windows NT the command to install a Windows NT INF is as follows: "rundll32.exe setupapi.dll,InstallHinfSection DefaultInstall 128 filename.inf". "rundll32.exe" is the executable run. "setupapi.dll" indicates the dll to use. "InstallHinfSection" indicates the parameter to the setupx.dll. "DefaultInstall" indicates the section in the filename.inf file to install. "128" indicates the reboot parameter (128 is do not reboot). "filename.inf" is the name of the INF file to install.

Turning next to FIG. 9, a registry is depicted in accordance with a preferred embodiment of the present invention. Registry 900 includes a system portion 902 and a user portion 904. System portion 902 contains information that is needed for the application to run on the particular client while user portion 904 contains information needed to tailor the application to the user.

With reference now to FIG. 10, a diagram illustrating a Windows user profile is depicted in accordance with a preferred embodiment of the present invention. User profile 1000 includes a user registry file 1002 along with subdirectories 1004. Each user is assigned a user profile, such as user profile 1000. User profile 1000 may be unique for each user or a set of users may be assigned a particular user profile. User registry file 1002 contains the user registry information that is to be sent to a client on which a user logs on. Subdirectories 1004 contains information, such as the look of the desktop and programs to be displayed to the user.

Figure 11:
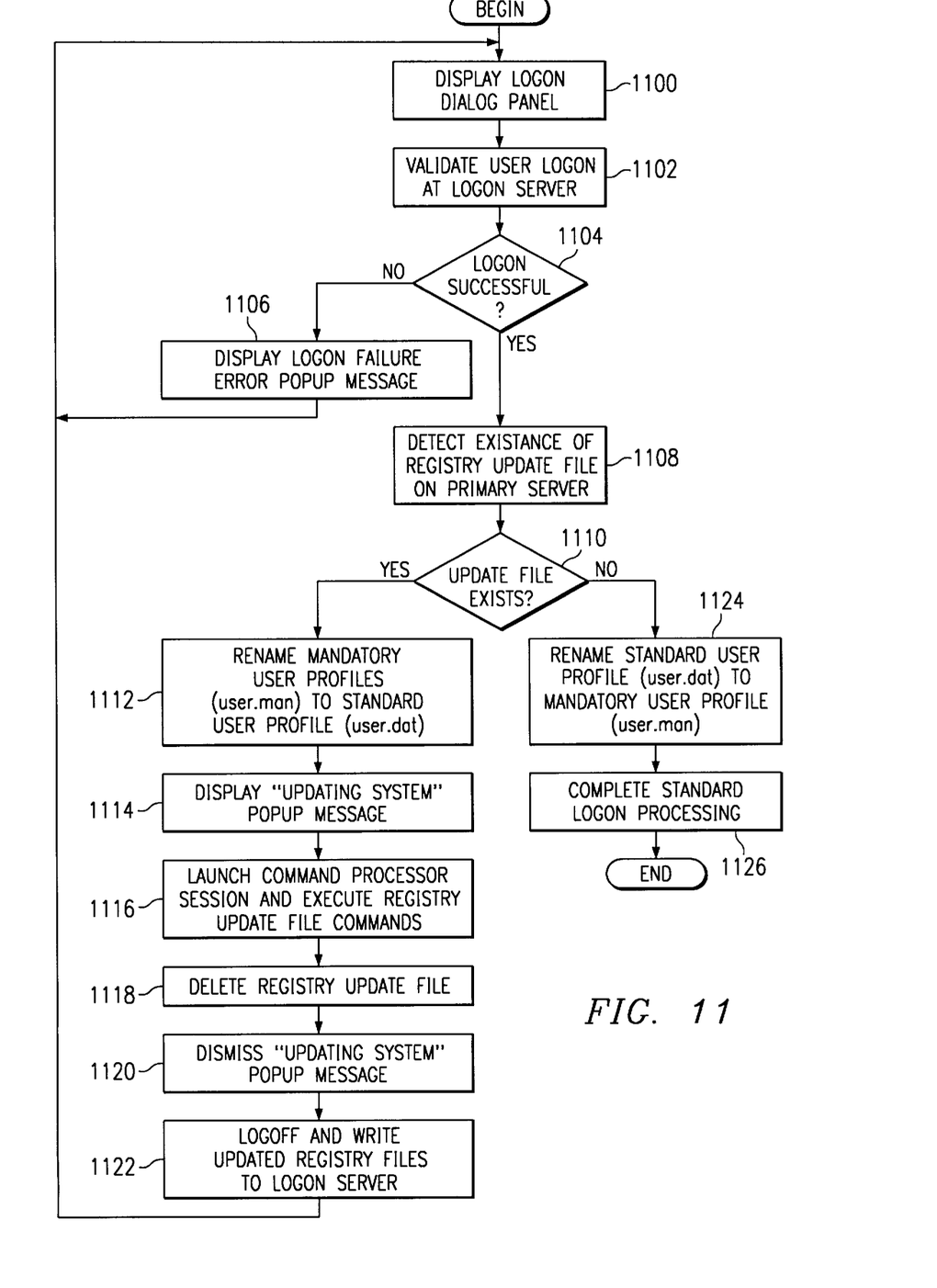
FIG. 11 is a flowchart illustrating a process for updating a registry in a client system depicted in accordance with a preferred embodiment of the present invention.

With reference now to FIG. 11, a flowchart illustrating a process for updating a registry in a client system is depicted in accordance with a preferred embodiment of the present invention. In FIG. 11, registry updates are applied to a windows client system that is logging on to a non-windows logon server.

The process begins by displaying a logon dialogue panel (step 1100). The user in this example is logging on to a windows based system, being either a Windows 95, Windows 98, or Windows NT system, which are available from a Microsoft Corporation. The user is presented with a standard logon panel. The user will enter the user ID, a password, and a domain name for the logon to be validated. Thereafter, the user logon is validated at the logon server (step 1102). Then, a determination is made as to whether the logon is successful (step 1104). If the logon is not successful, then a logon failure error popup message is displayed (step 1106). This message will typically describe the reason for the logon failure. Thereafter, the process returns to step 1100.

On the other hand, if the logon is successful, then a test is made to determine whether a registry update file is stored in the user specific location on the primary server is present (step 1108). A determination is then made as to whether the update file exists (step 1110). If the update file exists, then the mandatory user profile (USER.MAN) is renamed to a standard user profile (USER.DAT) (step 1112). A mandatory user profile cannot be changed at the client while a standard user profile can be changed at the client. In this step, error codes are not processed because the user profile may not exist or may already be renamed to the standard user profile name. This step is used to allow changes to the user profile at the client. Typically, when a mandatory user profile is present, the client is unable to make changes to the user profile. Thereafter, a message "updating system" is displayed as a popup message (step 1114). The system status popup message in step 1114 also may include an announcement that the user must logon to the system again after the system update processing has been completed. Registry update commands are located in a registry update file processed by the operating system batch file processor in this example. The command processor session is launched and the registry update file commands are then executed (step 1116). These steps are used to apply changes to the standard user profile on client. These registry update file commands are standard windows API's in the depicted examples. They may be through regedit.exe or run.dll mechanisms. The command processor is launched through a standard call to the batch program.

Next, the registry update file is deleted (step 1118). This registry update file is deleted from the server because the next logon will not require additional changes to the user profile. This deletion of the registry update file prevents the registry update from being processed repeatedly during the next logon cycle. Thereafter, the "updating system" popup message is dismissed or removed from view (step 1120). A logoff of the user is initiated and the updated registry files are written to the logon server (step 1122). The purpose of this logoff is to cause the updated registry files to be written back to the location of the user's home directory and to prevent the exposure of the user desktop to the user and to prevent other system updates from occurring while the system is under the control of the standard user profile. Then, the process returns to step 1100 to display a logon dialogue panel to the user.

With reference again to step 1110, if an update file does not exist, the standard user profile (USER.DAT) is renamed to a mandatory user profile (USER.MAN) (step 1124). This step causes the user profile to be changed back to a mandatory user profile so that the user or client is unable to make changes. Thereafter, the standard logon processing is completed (step 1126) with the process terminating thereafter.

Thus, the present invention provides an improved mechanism for updating a registry from a heterogeneous server. The present invention allows a server to make changes to a data structure used to store information for users, applications, and devices. This data structure is one that the server is unable to directly change. The changes are made during logon or authentication of the user. The changes are implemented in these examples through a set of instructions that are executed when the local registry at the client does not support the user. As a result, the present invention allows for a heterogeneous server to update a Windows client.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples illustrated updates made to a registry, the processes of the present invention also may be applied to other data structures used to store information necessary to configure the system for one or more users, applications, and hardware devices. Further, the processes of the present invention may be applied to providing updated user information to a client when that information is absent from the client. For example, other user specific files also may be sent to the client in addition to or in place of changes to the registry. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing registries, the method comprising the data processing system implemented steps of:

detecting a user at a client data processing system, wherein a change in access for the user has occurred;

sending a registry file containing user specific information for the user to the client data processing system;

updating a registry on the client data processing system using the registry file using commands specific to the platform, wherein an updated registry is created including the user specific information; and sending the updated registry to a depository.

2. The method of claim 1 further comprising:

responsive to detecting the user at the data processing system, sending the updated registry to the client data processing system.

3. The method of claim 1, wherein the registry includes user specific information.

4. The method of claim 1, wherein the change in access is a change in access to a application.

5. The method of claim 4, wherein the change in access to the application is an addition of the application to applications accessible by the user.

6. The method of claim 4, wherein the change in access to the application is a removal of the application from applications accessible by the user.

7. The method of claim 1, wherein the user is detected at the data processing system when the user logs onto to the network.

8. The method of claim 1, wherein the depository is located at a server data processing system.

9. The method of claim 1, wherein the client data processing system is a workstation.

10. The method of claim 1, wherein the client data processing system is a personal digital assistant.

11. A data processing system for managing registries, the data processing system comprising:

detecting means for detecting a user at a client data processing system, wherein a change in access for the user has occurred;

sending means for sending a registry file containing user specific information for the user to the client data processing system;

updating means for updating a registry on the client data processing system using the registry file using commands specific to the platform, wherein an updated registry is created including the user specific information; and sending means for sending the updated registry to a depository.

12. The data processing system of claim 11 further comprising:

sending means, responsive to detecting the user at the data processing system, for sending the updated registry to the client data processing system.

13. The data processing system of claim 11, wherein the registry includes user specific information.

14. The data processing system of claim 11, wherein the change in access is a change in access to an application.

15. The data processing system of claim 14, wherein the change in access to the application is an addition of the application to applications accessible by the user.

16. The data processing system of claim 14, wherein the change in access to the application is a removal of the application from applications accessible by the user.

17. The data processing system of claim 11, wherein the user is detected at the data processing system when the user logs onto to the network.

18. The data processing system of claim 11, wherein the depository is located at a server data processing system.

19. The data processing system of claim 11, wherein the client data processing system is a workstation.

20. The data processing system of claim 11, wherein the client data processing system is a personal digital assistant.

21. A computer program product in a computer readable medium for managing registries, the computer program product comprising:

first instructions for detecting a user at a client data processing system, wherein a change in access for the user has occurred;

second instructions for sending a registry file containing user specific information for the user to the client data processing system;

third instructions for updating a registry on the client data processing system using the registry file using commands specific to the platform, wherein an updated registry is created including the user specific information; and fourth instructions for sending the updated registry to a depository.

\* \* \* \* \*

UNITED STATES PATENT AND TRADEMARK OFFICE
CERTIFICATE OF CORRECTION

PATENT NO. : 6,347,331 B1  
DATED : February 12, 2002  
INVENTOR(S) : Dutcher et al.

It is certified that error appears in the above-identified patent and that said Letters Patent is hereby corrected as shown below:

<u>Column 10,</u>
Line 61, after "regedit.exe or", please delete "run.dll" and insert -- rundll --.

<u>Column 13,</u>
Line 6, after "onto", please delete "to".

Signed and Sealed this

Eleventh Day of February, 2003

JAMES E. ROGAN
*Director of the United States Patent and Trademark Office*